United States Patent
Stiehler

(10) Patent No.: US 9,435,216 B2
(45) Date of Patent: Sep. 6, 2016

(54) SEALING ARRANGEMENT IN AN AXIAL TURBOMACHINE

(71) Applicant: MTU Aero Engines AG, Munich (DE)

(72) Inventor: Frank Stiehler, Bad Liebenwerda (DE)

(73) Assignee: MTU Aero Engines GmbH, Munich (DE)

(*) Notice: Subject to any disclaimer, the term of this patent is extended or adjusted under 35 U.S.C. 154(b) by 0 days.

(21) Appl. No.: 14/474,966

(22) Filed: Sep. 2, 2014

(65) Prior Publication Data

US 2015/0061228 A1    Mar. 5, 2015

(30) Foreign Application Priority Data

Sep. 4, 2013  (DE) .................. 10 2013 217 581

(51) Int. Cl.
  *F16J 15/44*  (2006.01)
  *F01D 11/00*  (2006.01)
  *F16J 15/32*  (2016.01)

(52) U.S. Cl.
  CPC ............ *F01D 11/00* (2013.01); *F16J 15/3288* (2013.01)

(58) Field of Classification Search
  CPC ................................................ F16J 15/3288
  USPC ....................................................... 277/355
  See application file for complete search history.

(56) References Cited

U.S. PATENT DOCUMENTS

| 6,173,958 | B1 | 1/2001 | Dinc et al. |
| 6,173,962 | B1 | 1/2001 | Morrison et al. |
| 8,459,652 | B2 | 6/2013 | Brueck et al. |
| 2003/0071423 | A1 | 4/2003 | Ulrichs |
| 2003/0178788 | A1 | 9/2003 | Larson et al. |
| 2004/0018085 | A1 | 1/2004 | Dhar et al. |
| 2010/0196139 | A1 | 8/2010 | Beeck et al. |
| 2011/0049810 | A1* | 3/2011 | Ferryman et al. ............ 277/355 |
| 2015/0016957 | A1 | 1/2015 | Schinko et al. |

FOREIGN PATENT DOCUMENTS

| DE | 603 12 066 T2 | 11/2007 |
| DE | 102013213386 | 8/2014 |
| EP | 1308655 | 5/2003 |
| EP | 1 655 526 | 5/2006 |
| EP | 1715224 | 10/2006 |
| WO | WO 01/59338 | 8/2001 |
| WO | WO2008/020002 | 2/2008 |

* cited by examiner

*Primary Examiner* — Gilbert Lee
(74) *Attorney, Agent, or Firm* — Davidson, Davidson & Kappel, LLC

(57) ABSTRACT

A sealing arrangement (100) in an axial turbomachine between, on the one hand, a rotor (1) and, on the other hand, a stator (3) and/or a housing, including a support device (7, 7') and a sealing element, whereby the support device (7, 7') extends essentially in the radial direction (r). In the axial direction (u) of the turbomachine, the support device (7, 7') has an axial contour that effectuates a stiffening effect for the support device (7, 7').

19 Claims, 2 Drawing Sheets

SEALING ARRANGEMENT IN AN AXIAL TURBOMACHINE

This claims the benefit of German Patent Application DE 10 2013 217 581.7, filed Sep. 4, 2013 and hereby incorporated by reference herein.

The present invention relates to a sealing arrangement in an axial turbomachine between, on the one hand, a rotor and, on the other hand, a stator and/or a housing.

BACKGROUND

Various seals, sealing systems and sealing arrangements are used in turbomachines, especially in axial turbomachines.

SUMMARY OF THE INVENTION

Application examples in turbomachines are labyrinth seals installed between rotating and static parts, bearing seals or static seals. Seals can be employed for various purposes such as, for instance, to reduce leakage in compressors having areas with different pressure levels, to increase the efficiency or to optimize the installation space in terms of size and weight. One objective of the present invention is to put forward a sealing arrangement between moving and static parts, resulting in an improvement of the structural-mechanical properties such as, for example, a stiffening of components of the sealing arrangement.

It is an object of the present invention to provide a sealing arrangement that comprises a support device as well as a sealing element, whereby the support device and the sealing element are two sealing arrangement components that have been manufactured separately and/or that are present separate from each other. The sealing arrangement is installed between a rotor as the moving part and a stator and/or a housing as the static part. The support device extends essentially perpendicular to the flow direction in the radial direction but it has an axial contour in the flow direction. The axial contour extends in the circumferential direction or along the circumference, especially along the entire circumference of 360°, and effectuates a stiffening of the support device in the sealing arrangement.

In all of the preceding as well as following passages, the use of the expression "can be" or "can have", etc. is synonymous with "preferably is" or "preferably has", and is intended to explain the embodiments according to the invention.

Whenever numerical values are mentioned, the person skilled in the art understands these as an indication of a numerical lower limit. Consequently, insofar as this does not lead to a contradiction that is recognizable by the person skilled in the art, she or he always interprets, for example, the phrase "one", as meaning "at least one". This understanding is encompassed by the present invention and so is the interpretation that a numerical value such as, for example, "one" can alternatively mean "precisely one" wherever this is technically possible in the view of the person skilled in the art. Both aspects are encompassed by the present invention and apply to all numerical values employed herein.

Advantageous refinements of the present invention are each the subject matter of subordinate claims and embodiments.

Embodiments according to the invention can comprise one or more of the features cited below.

In certain embodiments according to the invention, the axial turbomachine is a gas turbine, especially a flue gas turbine. A flue gas turbine can be referred to as a turbine jet-propulsion engine. A flue gas turbine especially has an intake, a compressor (with a low-pressure compressor and a high-pressure compressor), a combustion chamber, a turbine (with a low-pressure turbine and a high-pressure turbine) and a thrust nozzle.

In some embodiments according to the invention, the sealing arrangement is attached to the stator and/or to the housing and/or to the rotor.

In certain embodiments according to the invention, the sealing arrangement can be detachably attached to the stator, to the housing or to the rotor. In particular, the sealing arrangement can be attached to a non-rotating component. The sealing arrangement can be attached or affixed in a groove, for instance, by means of clamping. Suitable securing means (securing pin, etc.) can secure the clamping against unintentionally coming loose during operation. The groove can extend along the entire circumference or along segments of the circumference.

In certain embodiments according to the invention, the sealing arrangement can be non-detachably joined to the rotor, to the stator or to the housing. Non-detachable connections can be soldered connections, welded connections or adhesive connections. Non-detachable connections can be material-bonded connections.

In some embodiments according to the invention, the sealing arrangement can be positioned between a rotor shaft and the tip of a guide vane that is positioned radially on the inside. Additional holding means can be fastened to the tip of the guide vane. The guide vanes can be arranged on a guide vane crown (or guide vane ring) that is joined to the housing of the turbomachine.

In some embodiments according to the invention, an effect that stiffens the support device by means of an axial contour of the support device in the circumferential direction means that the axial contour effectuates a stiffening of the structure of the support device. An axial contour of the support device can mean that the support device, as seen along the circumference or geometric features that extend in the axial direction. These structures or geometric features can have a stiffening or stabilizing effect, especially in terms of the dynamic behavior of the support device. For instance, reinforced or widened sections of the support device in the axial direction—for example, two reinforced sections at a circumferential angle of 0° and 180°—can have a stabilizing effect on the vibration behavior of the support device.

Stiffening of the structure can account for the structural-mechanical integrity of the support device. The structural-mechanical integrity is particularly important for dynamic engine components of the turbomachine and for the dynamic behavior of the engine itself.

In some embodiments according to the invention, the sealing element is configured so as to be ring-shaped. The sealing element can be inserted as a complete ring—for example, produced and assembled from several individual parts—into the axial turbomachine, for example, into housing grooves or holding rings of the guide vanes. As an alternative, the sealing element can be inserted along the circumference in the form of several segments, so-called sealing-element segments.

In certain embodiments according to the invention, the sealing element is a brush seal. A brush seal can have a core sealing element and a housing. Moreover, the core sealing element can comprise a core wire, a wire packet or a fiber packet as well as a clamping tube. The housing of the brush seal can have a cover ring that protects the core sealing element, and additional elements to cover and/or stabilize the brush seal.

In some embodiments according to the invention, the wires of the wire packet or the fibers of the fiber packet can be clamped mechanically, for example, with a positive fit.

In some embodiments according to the invention, the wire packet has metallic wires made of a cobalt-nickel-chromium-tungsten material (e.g. Haynes® 25) or else it is made of these materials. By way of an example, the wires can have a diameter between 0.05 mm and 0.2 mm.

In certain embodiments according to the invention, the fiber packet has polymer fibers (e.g. aramide) or else it is made of these materials. By way of an example, the wires can have a diameter between 0.01 mm and 0.05 mm.

In some embodiments according to the invention, the support device is configured so as to be ring-shaped. The support device can be inserted as a complete ring—for example, produced and assembled from sheet metal or from some other thin-walled material—into the axial turbomachine, for example, into housing grooves or holding rings of the guide vanes. As an alternative, the support device element can be inserted along the circumference in the form of several segments, that is to say, so as to be segmented.

In some embodiments according to the invention, the support device is configured so as to be wavy in a developed view.

The term "developed view" as set forth here refers in some embodiments according to the invention to a projection of the support device in a view or as seen from radially inside to radially outside, for example, along the entire circumference. The developed view is the depiction of this projection on a two-dimensional plane. If the developed view is, for instance, wavy, this means that the axial contour of the support device is wavy in the circumferential direction, in other words, along the circumferential direction, for example, from 0° to 360° in the case of the entire circumference, at least on the radial inner end of the support device whose developed view is depicted.

In certain embodiments, the wavy developed view is periodic (whole-periodic, half-periodic, etc.), or it has a sinusoidal wave shape, a short-wave shape or some other wavy shape. In the case of a whole-periodic wave shape, a whole or full period is imaged along the circumference of 360°. In other words, the wavelength at a whole-periodic wave shape corresponds to a complete circumferential length (mathematically, a circumferential length U is described by the following formula: $U=2*\pi*r$, wherein $\pi=3.14159265359$ and r stands for the radius). In the case of a half-periodic wave shape, a half period is imaged along the circumference of 360°. In the case of a short-wave shape, the developed view of the wave shape has several waves or periods along the circumference of 360°.

In certain embodiments according to the invention, the support device is configured so as to have a zigzag shape in a developed view. A developed view with a zigzag shape has several straight sections arranged one after the other at the same or at different angles. A developed view with a zigzag shape can be regular, that is to say, the angles of the sections arranged one after the other are the same along the developed circumference, or else they are irregular.

In some embodiments according to the invention, the developed view has at least four straight sections arranged one after the other along the circumference.

In some embodiments according to the invention, the ratio of the width (A) of the axial contour to the width (B) of the support device is between 2 and 10. The width (B) of the support device will be referred to below as the structural width. The structural width can vary in the circumferential direction. If, for instance, the support device is configured so as to be plate-like, then a structural width that varies along the circumference means that the support device has different plate thicknesses at the inner radial end (in the developed view, the inner radial end of the support device is shown two-dimensionally). The structural width is constant especially along the circumference, at least within manufacturing tolerances of the support device.

The width of the axial contour corresponds to the axial extension or deflection of the support device perpendicular to the circumferential direction. In the case of a sinusoidal wave shape, the width of the axial contour corresponds to the double amplitude or to the total deflection of the wave perpendicular to the expansion.

In a certain embodiment according to the invention in a numerical example given purely by way of an example, the structural width is 3 mm and the width of the axial structure is 21 mm, thus yielding a ratio of 7 for the width of the axial contour with respect to the structural width.

In certain embodiments according to the invention, the support device extends in the radial direction beyond the radial length of the sealing element, especially radially outwards.

In certain embodiments according to the invention, the support device is a brushing device. A brushing device in a sealing arrangement can serve to minimize a gap that is to be sealed. For this purpose, the brushing device can have a brushing surface by means of which a gap is formed between a moving part and a static part during a friction process.

In some embodiments according to the invention, the brushing surface (or friction surface) of the support device is enlarged by an axial contour in the circumferential direction in comparison to a support device without an axial contour in the circumferential direction. The support device having an axial contour in the circumferential direction can cover or brush over a larger surface area than the support device without an axial contour, for example, when the rotor is rotated by 360°, whereby the radially internal brushing or friction end surface of the support device acts against or seals said rotor.

An embodiment according to the invention is given below purely by way of an example, having a brushing surface with and without an axial contour (or an extension in the axial direction) of the support device. To start with, a structural width of 3 mm (width of the support device at the inner radial end at a constant width along the circumference) and a width of the axial contour of 21 mm are assumed. Moreover, the diameter of the rotor against which the brushing surface seals is assumed to be 500 mm. This yields a brushing surface area (or circumferential surface area) of approximately 4,712 mm$^2$ ($2*\pi*250$ mm*3 mm) without the axial contour, and a brushing surface area of approximately 32,987 mm$^2$ ($2*\pi*250$ mm*21 mm) with the axial contour. In other words, in this embodiment, the brushing surface area is greater by a factor of 7 (width of the axial contour of 21 mm versus the structural width of 3 mm). Owing to the enlargement of the brushing surface area (friction surface area), the frictional forces advantageously decrease, and thus so do the temperatures on the brushing surface caused by the frictional forces.

In some embodiments according to the invention, the sealing arrangement is located between a guide vane ring and the rotor. This area inside the axial turbomachine can be referred to as the inner-air seal (IAS) area.

In some embodiments according to the invention, the sealing arrangement is located between an area of the housing and the rotor.

Some or all of the embodiments according to the invention have several or all of the advantages mentioned above and/or below.

It is advantageously possible to achieve structural-mechanical integrity of the support device by means of the sealing arrangement according to the invention in the axial turbomachine, which has a support device with an axial contour (or an axial extension in the flow direction) that has a stiffening effect. The structural-mechanical integrity can be increased or improved, for instance, by means of a better vibration behavior (e.g. smaller vibration amplitudes, shifting of the eigenfrequency behavior so as to fall outside of the envisaged operating range) and/or by means of optimized values relating to the thermal-mechanical fatigue (TMF) behavior.

Moreover, the circumferential surface of a rotor against which the brushing device acts via its brushing surface can be advantageously enlarged by means of the axial contour of the support device and by means of a support device that acts as a brushing device. This advantageously reduces the temperatures caused by the friction effect of the brushing surface.

By means of the sealing arrangement according to the invention that has a support device with an axial contour that has stiffening effect, the (mechanical) moment of resistance of the support device can be increased, thanks to the axial contour that has stiffening effect. This can advantageously allow a weight optimization (in the sense of a weight reduction) in that individual components of the turbomachine can be configured so as to be smaller and lighter in weight.

BRIEF DESCRIPTION OF THE DRAWINGS

The present invention will be explained by way of an example below with reference to the accompanying drawings in which identical or similar components are designated by identical reference numerals. The following applies to the figures shown in schematically simplified form.

DETAILED DESCRIPTION

Figure 1:
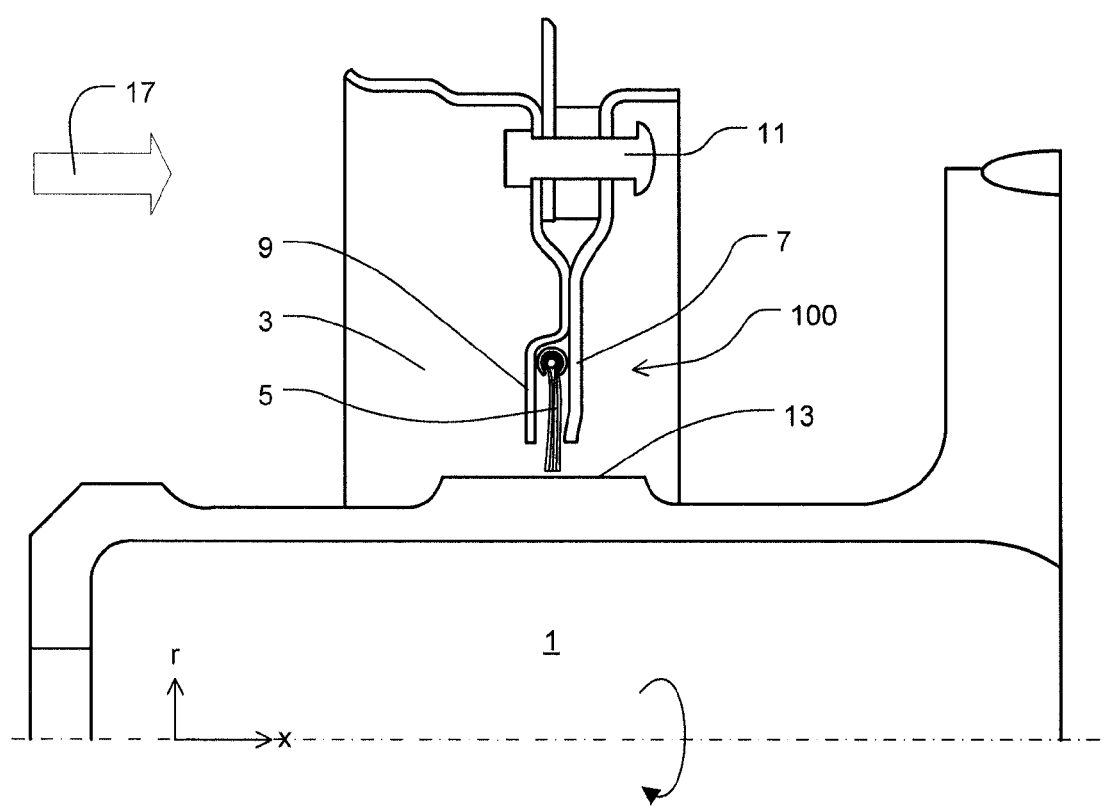
FIG. 1 a sectional view of a sealing arrangement according to the invention, comprising a rotor, a stator and a brushing device.

FIG. 1 shows a sectional view of a sealing arrangement 100 according to the invention, comprising a rotor 1, a ring-shaped stator 3 and a ring-shaped brush seal 5 as the sealing element. The brush seal 5 is attached or affixed to the circumference of the turbomachine between a support device 7 and a holding plate 9 of the stator 3 by means of mechanical clamping. The support device 7 extends likewise in a ring-shaped manner along the circumference. The brush seal 5 is affixed between the holding plate 9 and the support device 7 by means of an axial fixation element 11.

The brush seal 5 seals against a rotating sealing surface 13.

The support device 7 can be configured so as to be located radially further towards the inside, all the way to the sealing surface 13 (not shown in FIG. 1). When the support device 7 is configured as a brushing device, the radial inner end surface of the support device 7 functions as a brushing surface. In the case of an axial contour (due to the sectional view, this is not shown in FIG. 1), the brushing surface can touch or brush a larger surface area of the rotor sealing surface 13 than a brushing surface that does not have an axial contour (extension in the axis direction x). Support devices having two different axial contours are shown in FIG. 2.

The support device 7 can be referred to as a so-called backing plate.

The entire arrangement in FIG. 1 can be part of a so-called inner-air seal (IAS) design.

The flow direction 17 of the axial turbomachine runs in the direction indicated by the arrow.

Figures 2A, 2B:
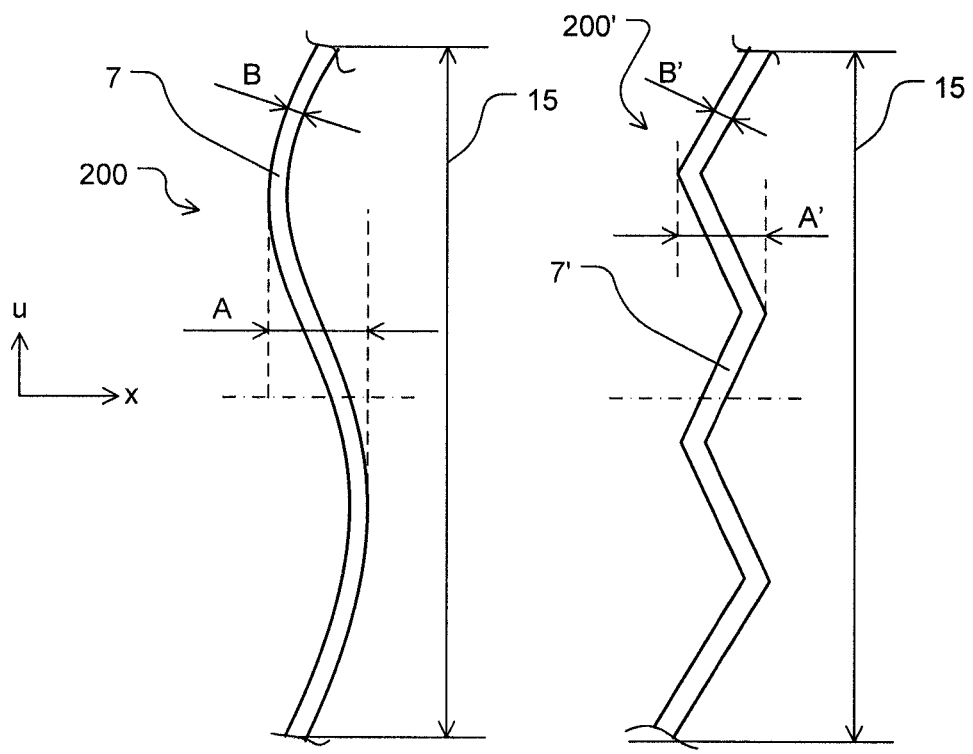
FIGS. 2a, 2b two developed views of two embodiments of support devices.

FIG. 2a shows a developed view 200 of a support device 7 in the circumferential direction u along a circumferential length 15 of 360°. In other embodiments, the developed view can have angles that are smaller than 360°, whereby the support device 7 is then segmented along the circumference u.

Purely by way of an example for this embodiment, the axial contour A in FIG. 2a has a width of approximately 21 mm. Purely by way of an example for this embodiment, the structural width B (in FIG. 2a, as seen from radially inside towards radially outside) of the support device 7 is approximately 3 mm. In this embodiment, this yields a ratio of 7 for the width of the axial contour A with respect to the structural width B.

The shape of the developed view of the support device 7 in the circumferential direction u is uniformly wavy and whole-periodic (the wave has a period of 360° along the circumferential length 15).

In one embodiment of the support device 7 as the brushing device, the width of the axial contour A corresponds to the contact width relative to the friction member of the rotor sealing surface 13 (see FIG. 1).

FIG. 2b shows another developed view 200' of a support device 7' in the circumferential direction u along a circumferential length 15 of 360°. The statements pertaining to the width of the axial contour A' as well as the structural width B' are analogous to those for FIG. 2a.

The developed view of the support device 7 has a zigzag shape, with four straight sections of the support device 7 each time.

LIST OF REFERENCE NUMERALS

Reference numeral Description
100 sealing arrangement
200, 200' developed view of a support device
r radial direction
x axis direction
u circumferential direction
A, A' width of the axial contour
B, B' structural width; width of the support device
1 rotor
3 stator
5 brush seal
7, 7' support device
9 holding plate
11 fixation element
13 rotor sealing surface
15 circumferential surface
17 flow direction

What is claimed is:

1. A sealing arrangement between: (a) a rotor and (b) a stator or a housing, the sealing arrangement comprising:
a support device;

a holding plate; and a seal element comprising a wire with bristles wrapped around the wire and a clip holding the wire and bristles together located between the support device and the holding plate, the clip having an inner surface contacting the bristles and an outer surface contacting the support device;

the support device extending radially, and, in the axial direction of the turbomachine, having an axial contour stiffening the support device;

wherein the support device or the seal element is configured so as to be ring-shaped or segmented in the circumferential direction, wherein the support device is configured so as to have a wavy or zigzag shape in a developed view.

2. The sealing arrangement as recited in claim 1 wherein the seal element is a brush seal.

3. The sealing arrangement as recited in claim 1 wherein the support device is configured so as to have the wavy shape.

4. The sealing arrangement as recited in claim 3 wherein a ratio of the width of the axial contour to the width of the support device is between 2 and 10.

5. The sealing arrangement as recited in claim 1 wherein the support device is configured so as to have the zigzag shape.

6. The sealing arrangement as recited in claim 5 wherein a ratio of the width of the axial contour to the width of the support device is between 2 and 10.

7. The sealing arrangement as recited in claim 1 wherein the support device extends in the radial direction beyond a radial length of the seal element.

8. The sealing arrangement as recited in claim 1 wherein the support device is a brushing device.

9. The sealing arrangement as recited in claim 1 wherein the sealing arrangement is located between a guide vane ring and the rotor.

10. The sealing arrangement as recited in claim 1 wherein the sealing arrangement is located between an area of the housing and the rotor.

11. The sealing arrangement as recited in claim 1 wherein the holding plate and support device are connected by an axial fixation element.

12. The sealing arrangement as recited in claim 1 wherein the support device is a backing plate.

13. A sealing arrangement between: (a) a rotor and (b) a stator or a housing, the sealing arrangement comprising:

a backing plate; and a seal element backed by the backing plate, the seal element comprising a wire with bristles wrapped around the wire and a clip holding the wire and bristles together; the clip having an inner surface contacting the bristles and an outer surface contacting the backing plate;

the backing plate extending radially, and, in the axial direction of the turbomachine, having an axial contour stiffening the support device;

wherein the backing plate or the seal element is configured so as to be ring-shaped or segmented in the circumferential direction, wherein the backing plate is configured so as to have a wavy or zigzag shape in a developed view.

14. The sealing arrangement as recited in claim 13 wherein the seal element is a brush seal.

15. The sealing arrangement as recited in claim 13 wherein a ratio of the width of the axial contour to the width of the backing plate is between 2 and 10.

16. The sealing arrangement as recited in claim 13 wherein the backing plate extends in the radial direction beyond a radial length of the seal element.

17. The sealing arrangement as recited in claim 13 wherein the backing plate is a brushing device.

18. The sealing arrangement as recited in claim 13 wherein the backing plate contacts an outside of the clip.

19. The sealing arrangement as recited in claim 13 wherein the holding plate contacts an outside of the clip.

* * * * *